United States Patent [19]
Cairo

[11] Patent Number: 5,809,116
[45] Date of Patent: *Sep. 15, 1998

[54] METHOD AND APPARATUS OF CERTIFYING A TELEPHONIC TRANSMISSION

[75] Inventor: Jerry Cairo, Chicago, Ill.

[73] Assignee: Matthew J. Cairo, Plant City, Fla.

[*] Notice: The term of this patent shall not extend beyond the expiration date of Pat. No. 5,566,230.

[21] Appl. No.: 823,870

[22] Filed: Mar. 25, 1997

[51] Int. Cl.[6] .................................................. H04M 11/00
[52] U.S. Cl. ............................... 379/93.07; 379/100.06; 358/400; 358/407
[58] Field of Search ................. 379/93.01, 93.05–93.08, 379/93.14, 93.21, 100.01, 100.03, 100.05, 100.06, 100.09, 100.12, 100.13, 100.17, 213, 214, 201, 142; 358/400–405, 407, 434–440, 442, 468

[56] References Cited

U.S. PATENT DOCUMENTS

| | | |
|---|---|---|
| 4,524,393 | 6/1985 | Ohzeki . |
| 4,642,697 | 2/1987 | Wada . |
| 4,670,791 | 6/1987 | Murata et al. . |
| 4,748,662 | 5/1988 | Hirata . |
| 5,018,191 | 5/1991 | Catron et al. . |
| 5,036,513 | 7/1991 | Greenblatt . |
| 5,038,226 | 8/1991 | Nagaishi ................ 358/468 |
| 5,057,941 | 10/1991 | Moriya ................... 358/440 |
| 5,155,601 | 10/1992 | Toyama .................. 358/401 |
| 5,260,991 | 11/1993 | Ikegaya .................. 358/442 |
| 5,274,467 | 12/1993 | Takehiro et al. ........ 358/440 |
| 5,283,665 | 2/1994 | Ogata .................... 358/434 |
| 5,303,296 | 4/1994 | Zucker ................... 379/67 |
| 5,341,413 | 8/1994 | Hori et al. ............. 358/440 |
| 5,351,136 | 9/1994 | Wu et al. ............... 358/440 |
| 5,357,245 | 10/1994 | Hagiwara ................ 379/199 |
| 5,377,017 | 12/1994 | Lam ...................... 358/405 |
| 5,404,231 | 4/1995 | Bloomfield ............. 358/400 |
| 5,459,584 | 10/1995 | Gordon et al. .......... 358/434 |
| 5,566,230 | 10/1996 | Cairo ..................... 379/100.06 |

FOREIGN PATENT DOCUMENTS

| | | | |
|---|---|---|---|
| 55-23642 | 2/1980 | Japan ................ H04N 1/32 |
| 58-184866 | 10/1983 | Japan ................ H04N 1/00 |
| 2-244933 | 9/1990 | Japan ................ H04L 12/54 |

*Primary Examiner*—Wing F. Chan
*Attorney, Agent, or Firm*—Welsh & Katz, Ltd.

[57] ABSTRACT

A method of the present invention of certifying delivery of a transmission through a public switch telephone network. The method includes the steps of detecting a request for certification of a transmission from a first telephonic communication unit by a local telephone switch of the public switch telephone network and forwarding the transmission from the first telephonic unit to a second telephonic unit through the local telephone switch. The method further includes the steps of copying the transmission within the local switch. A mirrored transmission from the destination telephonic unit to the first telephonic unit is detected by the local switch and the mirrored transmission is copied within the local switch. A hardcopy of the transmissions and identifiers of the first and second telephonic units is provided through a printer of the local switch.

61 Claims, 4 Drawing Sheets

METHOD AND APPARATUS OF CERTIFYING A TELEPHONIC TRANSMISSION

FIELD OF THE INVENTION

The field of the invention relates to telephonic transmissions and in particular to means for certifying telephonic transmissions.

BACKGROUND

Electronic transmissions through a public switch telephone network (PSTN) are known. Well known examples of such transmissions include facsimile, E-mail, or data transfers between computers using a modem. Within a fax machine the printed or graphical information is typically converted into an electrical signal using an optical scanner. A modem within the fax machine converts the electrical signal from the optical scanner into a variable frequency, electrical signal typically in the audio range, for transmission through the PSTN.

At a fax receiver the variable frequency signal is converted into a variable direct current (DC) voltage which is then used to recreate the image detected by the scanner at the transmitting fax machines.

To initiate a telephonic transmission an operator enters a destination telephone number of the transmission and identifies a file for transmission. Once set-up is complete, the transmitting device (telephonic unit) seizes an interconnected telephone line and transmits the destination telephone number to a controller within the PSTN. The PSTN controller through a number of local and remote telephone switches, interconnects the calling telephonic unit to a target telephonic unit. A local PSTN controller notifies the target telephonic unit of the incoming call by imposing an alerting signal (a ringing signal) on a telephone line associated with the target telephonic unit to ring. The target telephonic unit detects the electrical pulses of the ringing, seizes the telephone line and establishes a connection with the transmitting telephonic unit. The information is then transferred from the transmitting to target telephonic unit.

While existing electronic communication devices such as fax machines work well, the prior art has taught that a such machines can not be relied upon where proof of delivery is required such as for notification of consumer product safety hazards or certain types of court documents. Where proof of delivery is required the prior art has taught that the only alternative is certified U.S. Mail or hand delivery. Because of the importance of certifying delivery of such documents a need exists for a method of certifying telephonic transmissions.

OBJECTS AND SUMMARY OF THE INVENTION

Accordingly, a primary object of the present invention is to provide a method for using existing telephone apparatus and equipment, but in an arrangement to enable the sending of electronic certified or registered telephonic transmissions.

A further and more particular object of this present invention is to provide the steps of a telephone "certified" or "registered" transmission system which enables the telephonic address of the recipient of the transmission to be recorded along with the time and date of the call and the contents of the transmission itself.

A further and more specific object of the present invention is to enable the transmission of a record of the transmission to the initiator of the call.

These and other objects of the present invention are provided in a method of the present invention of certifying delivery of a transmission through a public switch telephone network. The method includes the steps of detecting a request for certification of a transmission from a first telephonic communication unit by a local telephone switch of the public switch telephone network and forwarding the transmission from the first telephonic unit to a second telephonic unit through the local telephone switch. The method further includes the steps of copying the transmission within the local switch. A mirrored transmission from the destination telephonic unit to the first telephonic unit is detected by the local switch and the mirrored transmission is copied within the local switch. A hardcopy of the transmissions and identifiers of the first and second telephonic units is provided through a printer of the local switch.

BRIEF DESCRIPTION OF A PREFERRED EMBODIMENT

The solution to the problem of certifying telephonic deliveries of information (e.g., fax, E-mail, etc.) lies conceptually in interconnecting a printer for certification of transmissions (certification printer, or certification receiver) through a local telephone switch of the PSTN and printing each transmission along with an indicia of delivery. The indicia of delivery may include telephone numbers of sending and receiving telephonic units, an indication that the message was properly delivered, and a time of delivery.

An originating device (e.g., a fax machine, E-mail sender, computer, or person requesting certification of voice delivery) may request delivery certification by a particular sequence of dialed digits. For example, a controller of a local switch of the PSTN could be programmed to recognize that where a character on a touch tone phone such as a "#" were pressed twice followed by a telephone number of a destination machine, that such sequence is to be interpreted as a request for delivery certification.

The controller of the local switch upon receiving the request for delivery certification would strip off the first two characters (##) and thereafter handle call routing between the originating and destination telephonic units as under the prior art. The certification printer may be added to the call connection under a technique similar to three-party calling. Alternatively, the transmission may be stored within a memory of the local switch and the transmission forwarded from memory under a receive and forward format.

The indicia of delivery of a transmission is information readily available to the controller of the local switch. The telephone number of the destination machine is received by the local switch controller during call set-up and is retained in memory of the local switch controller. Time and date are also available within the local switch controller as part of call billing facilities. The acknowledgment of receipt of a page of a transmission (e.g., a fax transmission), on the other hand, is something that the local switch controller obtains by monitoring the fax transmission.

For example, during a fax transmission, the originating fax transmits information one line at a time until an end of page is encountered at which time the receiving fax machine acknowledges receipt of the page, or the originating fax re-transmits the page. Under an embodiment of the invention, the local switch controller monitors the fax transmission for page receipt acknowledgments. Under the embodiment, page receipt acknowledgment may include receipt of a mirrored image of the originally transmitted page. Upon receipt of a page acknowledgment the certification fax receiver prints the indicia of delivery on a locally printed reproduction of the fax page thereby certifying delivery of the fax page.

Figures 1, 2:
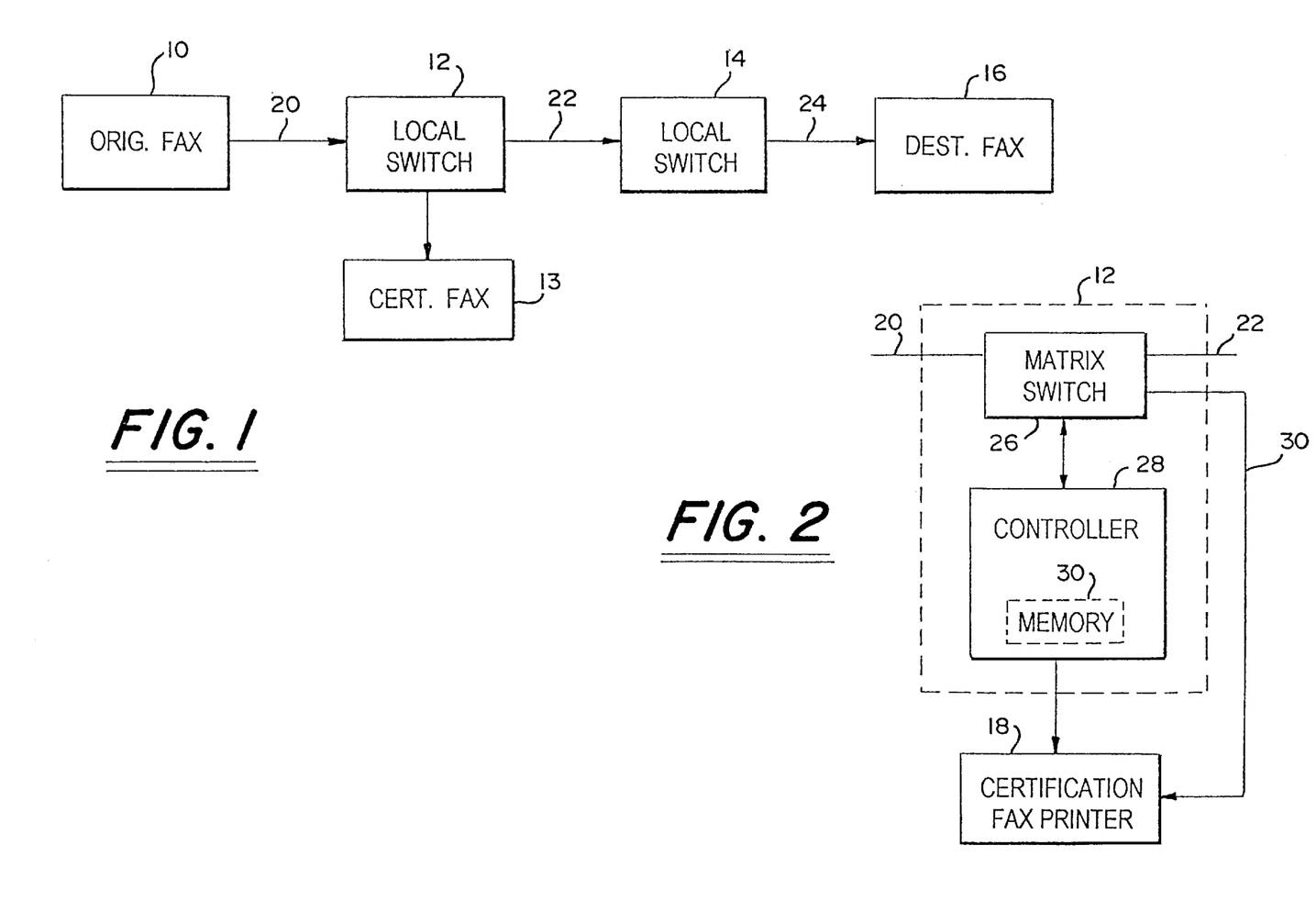
FIG. 1 is a block diagram showing transmitting and receiving telephonic machines interconnected through a telephone network having transmission certification apparatus in accordance with an embodiment of this invention.
FIG. 2 is a block diagram of a local telephone switch and interconnected transmission certification apparatus in accordance with an embodiment of this invention

FIG. 1 is a block diagram of a PSTN system showing the fax certification feature in accordance with an embodiment of the invention. As shown, an originating fax 10 is provided with a telephone interconnect 20 between the originating fax 10 and a local switch 12 of the PSTN. A destination fax 16 may be interconnected directly to the same local switch 12 as the originating fax 10 or be interconnected through a second local switch 14 as shown in FIG. 1.

It is to be understood that local switches 12, 14 of a PSTN each have a number of telephone interconnects 20, 24 depending on the size of the local switch 12, 14 and the number of local subscribers 10, 16 in the geographic area of each local switch 12, 14. It is also to be understood that local switches 12, 14 of a PSTN are interconnected through a number of trunk groups were the trunk groups provide a means of exchanging communicated information between a first local switch and other local switches in other geographic areas. FIG. 1, in specific, shows a first local switch 12 in a first geographic area interconnected with a second local switch 14 in a second geographic area through a particular trunk group 22.

Each trunk group 22 is made up of a number of communication channels that, within an integrated services digital network (ISDN), may range from a basic rate interface (BRI) (with very few channels and fairly low capacity) to the larger T1 lines with capacities in excess of one Megabits per second. If local switches 12, 14 were of a fairly low capacity, then the interconnecting trunk group 22 may be made up of one or more BRIs where each BRI consists of 2-B channels (typically used for the exchange of subscriber traffic information at a rate of 64 kilo bits per second per channel) and 1-D channel (used for the exchange of control information between switches at a rate of 15 kilo bits).

FIG. 2 is a block diagram of the local switch 12 and fax certification printer 18 of FIG. 1. As shown, the local switch 12 has a matrix switch 26 and local switch controller 28. During normal operation of the PSTN the local switch controller 28 periodically monitors local telephone interconnect 20 for call requests. Upon receipt of a call request, the controller 28 by reference to a called number received from the originating fax machine 10 on a telephone interconnect 20 determines by reference to a memory 30 that the target of the call request (destination fax 16) may be accessed through a particular trunk group 22 and local switch 14. To establish a connection between the originating fax machine 10 and destination fax machine 16 the local switch 12 of the originating fax machine 10 (requesting switch 12) seizes a D channel of the trunk group 22 and transmits an access request to the local switch 14 of the destination fax machine 16 (destination switch 14). If the destination fax 16 is not occupied by a prior call (telephone interconnect 24 busy) and a subscriber traffic channel (B channel) between the requesting switch 12 and destination switch 14 is available, then the destination switch 14 responds by transmitting an access grant back to the requesting switch 12 identifying an allocated traffic channel to be used during the fax transmission. The destination switch 14 also signals the destination fax 16 of the incoming call. When the destination fax 16 answers the call, switch 14 connects telephone interconnect 24 with the identified traffic channel of the trunk group 22.

The controller 28 of the requesting switch 12, in response to the access grant and to the destination fax answering the call, directs the matrix switch 26 to provide an connection between the allocated traffic channel of the trunk group 22 and the telephone interconnect 20 of the originating fax 10.

Immediately after answering the call, the destination fax 16 begins transmitting a connect tone. When the end-to-end connection of the duplex channel between the originating fax 10 and destination fax 16 is completed, the originating fax 10 answers the connect tone and a negotiation of fax transmission protocol and transmission baud rate follows. Following completion of set-up of originating fax 10 and destination fax 16, the transmission of the fax message may begin.

Where the call request received from the originating fax 10 contains a request for fax certification, the controller 28 of the requesting switch 12 also instructs the matrix switch 26 to provide a three-party connection among the telephone interconnect 20 of the originating fax 10, the allocated traffic channel of the trunk group 22 and the interconnect 30 of the certification fax 18. During fax set-up the certification fax 18 by monitoring the exchange between the originating fax 10 and destination fax 16 is set up substantially the same as the destination fax 16.

Interconnect 30, under the invention, is in the nature of a simplex connection allowing one-way transmission of fax data to the certification fax. The certification fax is not allowed to request a re-transmission of lost data from the originating fax 10.

Since the certification fax does not participate in the negotiation of fax protocol or speed and since the certification fax must accommodate the capabilities of originating and destination fax machines, the certification fax may be of a somewhat greater level of sophistication than the originating or destination fax machines. In all other regards, the certification fax may be selected from any of a range of commercially available fax machines.

Under an embodiment of the invention, provisions are made to avoid printing the indicia of delivery on top of the contents of each page of the fax transmission. Under such an embodiment an oversize paper tray (e.g., for 17 inch by 23 inch paper) is used to supply the certification fax. The oversize supply sheet is queued in a normal manner with the information of each page of the fax transmission printed at the top of the oversized sheet within the certification fax machine. At the output end of the certification fax machine an appropriate printer (e.g. a laser printer) is provided for printing the indicia of delivery on the bottom of each oversized sheet. Together, the certification fax machine and certification printer comprise a certification fax printer 18 providing a degree of reliability of delivery of fax transmissions not available from other sources.

The certification printer is programmed in a known manner to print the indicia of delivery in a non-interfering location of the printed document certifying fax delivery. The indicia of delivery are transferred to the certification printer from the local switch controller 28 via an appropriate data interface (e.g., RS232 or a LAN). The controller 28 may provide the indicia of delivery such as the telephone number of the destination fax 16 based upon the destination telephone number included in the original access request, or may query the destination switch 14 over an appropriate D channel of the trunk group 22 after each page of the fax transmission to determine where that page of the fax transmission was sent for purposes of providing additional certainty in the verification process.

Following completion of the documents certifying the delivery of a fax transmission, copies of the document may be sent via regular mail or express delivery to the originating and destination parties, with the original documents held in secure storage of the telephone company or some other third party. Holding the original documents in an area of secure storage allows for a greater reliability against alteration. Such a method also allows for a certification system operator to later offer testimony in a court of law, or otherwise, as to the methods used in certification and to the reliability of such services.

In another embodiment of the invention, the certification fax machine and certification printer are combined into one device. Under such an embodiment a page of fax material is compressed in size to occupy ¾ of a standard size fax page with indicia of delivery occupying the remaining ¼ of the fax. Data delivery to the certification fax under the embodiment is accomplished through use of a data buffer in series with the interconnect 30 and with a data switch interposed between the buffer and certification fax under the control of the controller 28. During transmission of a page of fax information the controller 28 instructs the data switch to pass fax information from the buffer to the certification fax. When the controller 28 detects an end-of-page message from the originating fax 10 and a page acknowledge message from the destination fax 16, the controller 28 instructs the data switch to interrupt the transfer of data from the buffer to the certification fax and, instead, pass indicia of delivery from an output of the controller 26 while the buffer accumulates any new data from succeeding fax pages. Once the data switch transfers the indicia of delivery from the controller 28 to the certification fax followed by a locally generated end-of-page, which indicia is printed on the bottom quarter of the fax page, the controller 28 again instructs the data switch to pass data from the buffer.

In another embodiment of the invention, the telephonic transmission is not printed immediately with indicia of delivery associated with each page but, rather, the entire transmission is stored as a common file with indicia associated with the entire file stored in conjunction with the file as a composite file. As with above embodiments, the composite file is stored in a secure facility with a single summary page printed after creation of the composite file and sent to the operator of the originating telephonic unit for record keeping purposes. Should a need arise for proof of delivery, the entire composite file is printed upon demand.

In another embodiment, the invention is extended to electronic mail (E-mail) systems operating upon PSTN. Under the embodiment the controller 28 of the switch 12 detects the request for such transmission through identifying digits using in conjunction with a target address. An E-mail printer associated with the switch 12 monitors the transmission through a three-party connection. As above, indicia of delivery are printed on a copy of the E-mail message (preferably in a different color).

In another embodiment of the invention, certification of delivery of E-mail messages is accomplished by the capture of a copy of the E-mail message within a local switch 54 (FIG. 3) and through comparison of transmitted and received copies. While such certification occurs sequentially, the process of certification may occur as part of one communication transaction.

Figure 5:
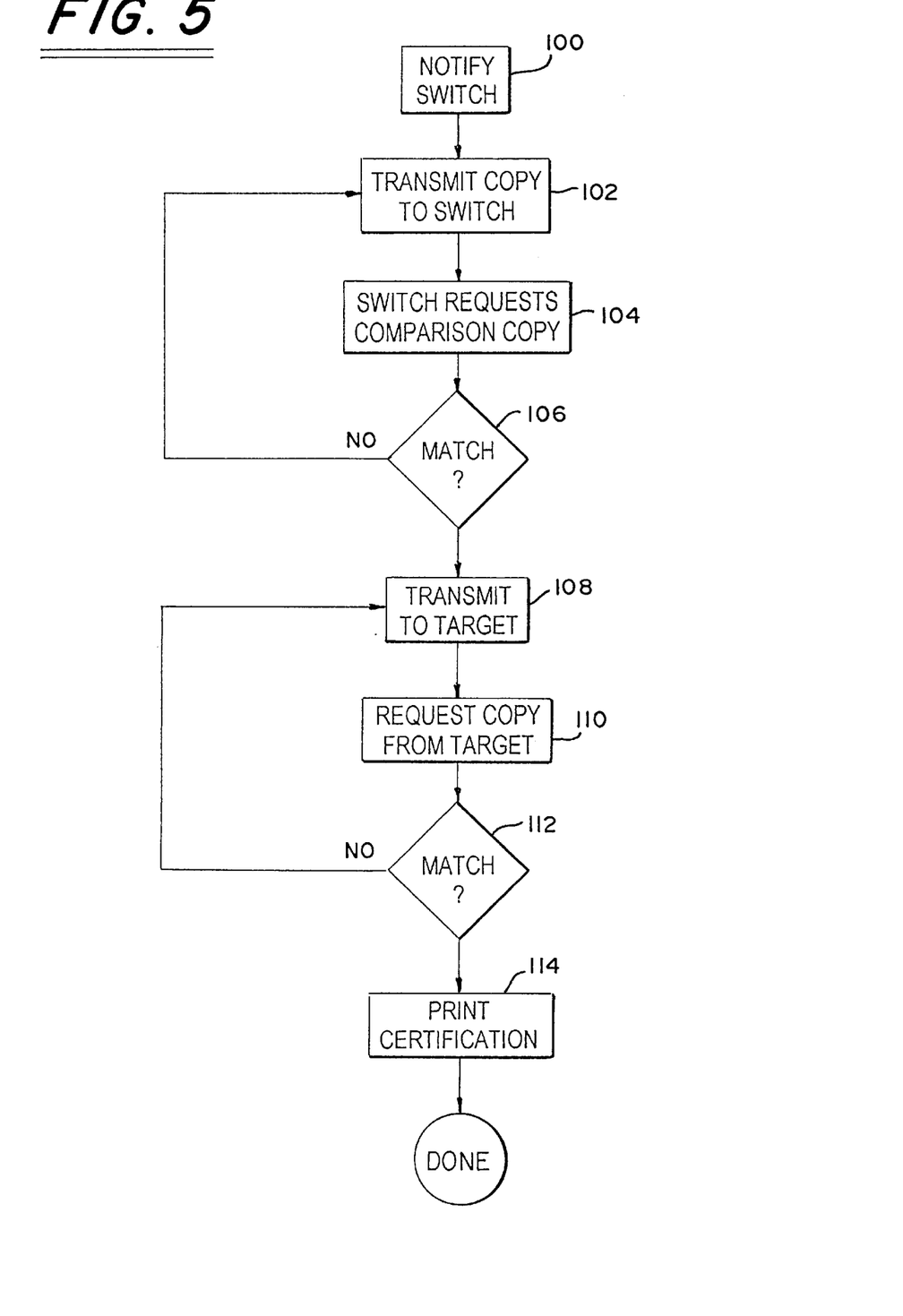
FIG. 5 is a flow chart depicting method steps that may be used by the apparatus of FIG. 3.

FIG. 5 is a flow chart of the process that may be used in the certification of E-mail messages. Reference shall be made to FIG. 5 as appropriate in the understanding of the invention.

Figures 3, 4, 6:
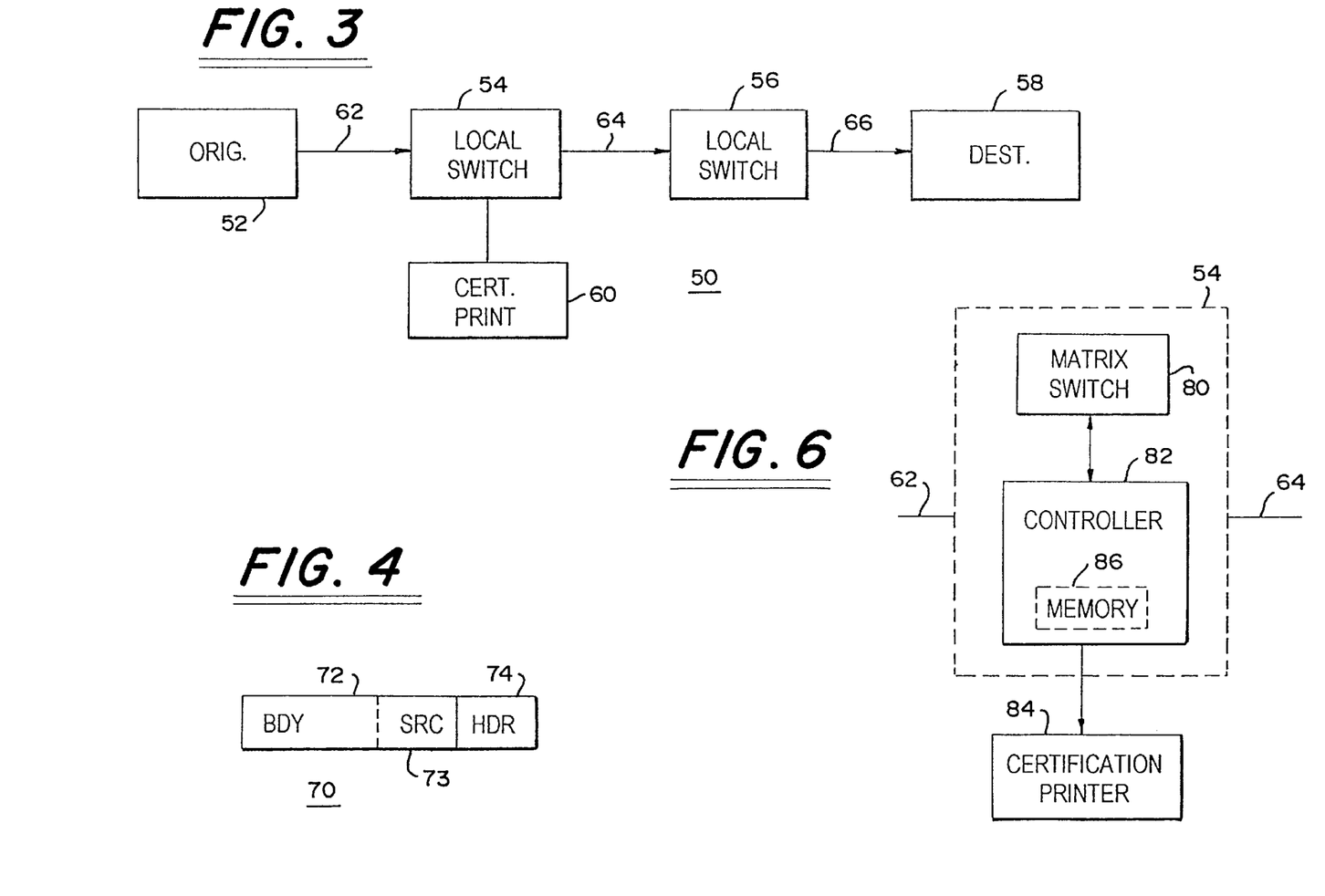
FIG. 3 is a block diagram showing transmitting and receiving telephonic machines interconnected through a telephone network having transmission certification apparatus in accordance with an alternate embodiment of FIG. 1.
FIG. 4 depicts an E-mail transmission for use with the embodiment of FIG. 3.
FIG. 6 depicts a telephonic controller of the switch of FIG. 3.

Under the embodiment, an originating computer 52 may initiate a certified E-mail transmission by transmitting a notification 100 (FIG. 5) in the form of a set-up message 70 (FIG. 4) for E-mail certification to the local switch 54. The set-up message 70 is made up of two parts, a header 74 and a body 72. The header 74 may be identifier of a controller 82 of the local switch 54 as the recipient of the message. The body 72 of the set-up message 70 may simply be a coded request to the controller 82 for certification of a subsequently transmitted E-mail message.

Following set-up, the originating computer 52 transmits the E-mail message addressed to the target computer 58. The local switch 54, however, temporarily intercepts the E-mail message and stores it in memory 86. The controller 82 then verifies the original transmission by forwarding a request to the originating computer 52 requesting 102 that the originating computer 52 transmit a duplicate of the original E-mail message. The originating computer 52 responds by re-transmitting another copy of the message. Upon receiving the re-transmitted E-mail message, the switch 54 compares the original E-mail message to the re-transmitted copy to verify the original transmission. If the re-transmitted E-mail message matches 106 the original E-mail message, then the switch 54 forwards the message to the destination computer 58. If not, then the switch 54 requests that the originating computer 52 re-transmit another copy.

Upon verifying that the switch 54 has received a valid copy, the switch 54 forwards 108 the E-mail message to the destination computer 58. However, before the switch 54 forwards the E-mail message, the controller 82 of the switch 54 may extract the address of the target of the E-mail message from the message and may compose its own message for delivery in association with the E-mail message. The message may simply notify the destination computer that the associated message is a certified E-mail message.

The switch 54 may also amend the original message to include indicia of certification. The indicia of certification may include an additional header appended to the beginning and end of the message announcing that the message has been certified.

Following delivery of the E-mail message to the destination computer 58, the controller 82 may send an additional message to the destination computer 58. The message composed by the switch 54 and transmitted to the destination computer 58 may request that the destination computer 58 send a copy of the received E-mail message back to the switch 54. The destination computer 58, upon receiving the original E-mail message and request from the switch 54, responds by transmitting (returning) a copy of the original E-mail message back to the switch 54. The switch compares the copy received from the destination computer 58 with the transmitted message. If the transmitted and returned messages match 112, the switch certifies to delivery of the E-mail message. The switch 54 may, in turn, create 114 a certificate of delivery, which may be retained in memory 86 or mailed to the owner of the originating computer 52 and destination computer 58.

The certificate of delivery may include a copy of the original E-mail message (including the E-mail address) along with indicia of delivery. The indicia of delivery may include a date and time of delivery.

Figure 7:
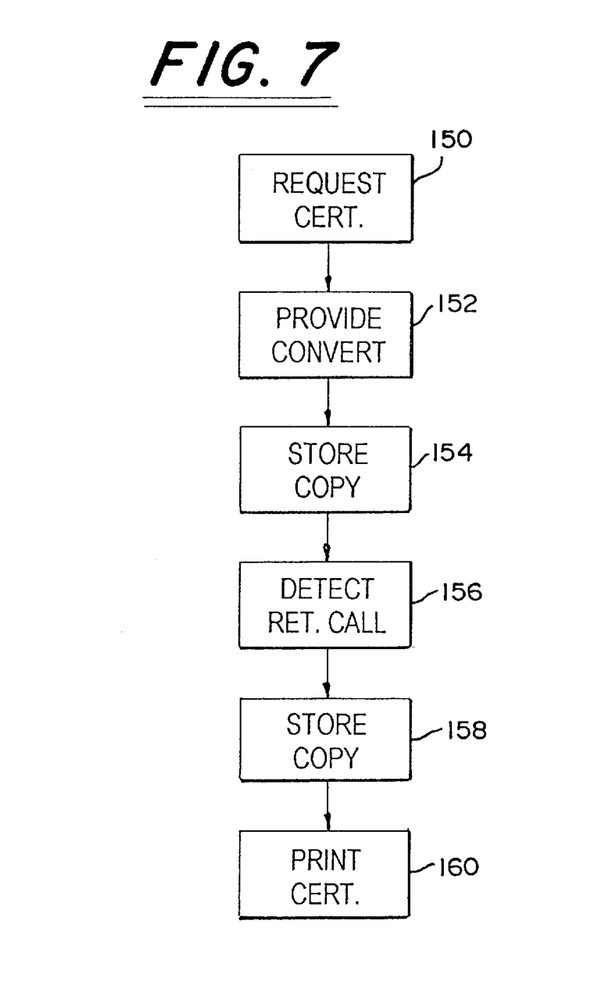
FIG. 7 is a flow chart depicting steps that may be used by the apparatus of FIG. 3, under an alternate embodiment.

In another embodiment of the invention, certification of a transmission may be accomplished without the benefit of a continuous end-to-end connection between originating and destination telephonic units. Under the embodiment, the originating telephonic unit 52 may initiate certification by the entry of a certification request 150 (FIG. 7). As above, a certification request may include the forwarding of a specific destination telephone number preceded by a certification request digits (e.g., ##). The originator 52 may immediately follow the certification request by transmission of a block of information or may wait for the local switch 54 to set up an end-to-end connection. Where the originator 52 waits for completion of the end-to-end connection, the local switch copies the block of information into memory 86 via a three-party connection.

Where the originator 52 follows the certification request with an immediate transmission of the block of information, the information is captured by the local switch 54 and stored in a memory 86 of the local switch 54, for subsequent transmission to the destination telephonic unit 58. Upon completion of the connection (between the local switch 54 and destination 58, the local switch 54 forwards the block of information from memory 86 to the destination 58.

Whether the transmission is immediate or delayed the block of information 70 may have the form shown in FIG. 4. In the case where a telephone number of the destination telephonic unit 58 is provided in advance of set-up of the connection, the header 74 would provide the destination telephonic unit 58 with indication that the transmission was a certified transmission and that a re-transmission of a copy of the body of the block 72 back to the originating telephonic unit 52 as a mirrored image is expected.

Following the header 74 is a source identifier 73. The source identifier 73 identifies the source of the certified transmission and provides the destination telephonic unit 58 with a telephone number for use in re-transmitting the mirrored image back to the source 52.

Where the transmission 70 is made under packet switching, or under an E-mail format, the header would identify the destination telephonic unit 58. The source message 73, in addition to identifying the source of the transmission 52 would also identify the transmission as being a certified transmission and notify the destination telephonic unit 58 to return a mirrored image of the body 72 of the transmission 70.

Upon delivery of the message 70, the connection over which the message 70 was delivered is torn down. Tearing down the connection allows certification to proceed with a minimum of disruption to normal telephone traffic at either originating or destination telephonic units 52, 58.

The originating telephonic unit 52 waits a predetermined time period (e.g., 2 minutes) for a response. If a response is not received within the time period, the transmission is repeated.

The destination telephonic unit 58, upon receiving the transmission 70, immediately identifies the transmission as a request for certification by reference to the header and source fields 74, 73. Upon determining that the transmission is a request for certification, the destination telephonic unit 58 composes a response. The destination telephonic unit 58 composes the response based upon the content of the fields 72, 73, 74 of the original transmission 70. The body 72 is a duplicate (mirror image) of the originally transmitted data. The header 74 and source fields 74, 73 now relate to the originating telephonic unit 52.

Where the response is provided under a plain old telephone service (POTS) format, the header 74 may simply identify the transmission as being a response to a certification request and the source message may simply identify the destination telephone unit 58. Where the response is provide under packet switching or E-mail, identification of the transmission as a response to a request for certification would be located in the source field 73. The header 74 would contain an identifier of the source telephonic unit 52.

To send the response in the case of service under POTS, the destination telephonic unit 58 would seize the telephone line 66 and transfer a telephone number of the source telephonic unit 52 to a local switch 56. Under E-mail, the destination telephonic unit would simply seize the appropriate channel and transmit the message. The local switch 56 of the destination telephonic unit 58 would forward the transmission 70 using normal processing techniques.

The local switch 54 of the originating telephonic unit, 52 upon sending the original certification transmission, monitors for responses. The local switch identifies responses through either of two methods. Under a first method, the local switch 54 may identify the call as being directed to the originating telephonic unit 52 based upon a dialed number identification service (DNIS) available to the switch 54 from within the PSTN. Under a second method the local switch 54 may identify the response based upon the identity of the call originator 58. In general, the local switch 54 receives with each delivered call an identifier of the call originator (i.e., now 58). The identifier is provided under an automatic number identification (ANI) service available from within the PSTN.

Similarly, where the transmission 70 from the destination telephonic unit 58 is under packet switching or E-mail, the local switch 54 examines the header and source fields 74, 73 to identify the transmission 70 as being a response to a request for certification. In either case, the local switch 54 may either pass the transmission 70 through immediately or store a copy of the response in memory 86 for later transmission. Where the local switch 54 immediately passes the transmission through, the storage of the copy in memory 86 may be by a three-party connection. Where the transmission 70 is stored, the transmission 70 may be completed at a later time by completing the communication from the copy stored in memory 86.

Where the mirrored copy is stored in memory 86, certification may be completed by printing both copies along with indicia of source, destination and time. Certification of accuracy may be established in such case by comparing the original transmission with the response.

In another embodiment, a bit-by-bit comparison may be performed by the controller 82 of the switch 54 between the stored body 72 of the transmission 70 from the source telephonic unit 52 with the stored body 72 of the transmission 70 from the destination telephonic unit 58. Where a match is found, the transmission is certified based upon the presence of a match. Certification may be printed including the body 72 of the two transmissions along with indicia of delivery.

In another embodiment of the invention, the originating and destination telephonic units 52, 58 further verify the transmissions 70 by comparing the body 72 of the mirrored transmission 70 with the information previously forwarded. For example, the originating telephonic unit 52, upon receipt of a mirrored image, may do a bit-for-bit comparison of that which was received with the original transmission 70. If the comparison fails the process starts over.

If the comparison is successful, the originating telephonic unit 52 re-sends (mirrors) the transmission 70 received from the destination telephonic unit 58 with an additional bit of the source field 73 set to indicate a successful transmission. The second transmission 70 from the originating telephonic unit 52 may be stored in memory 86 of the local switch 54.

The destination telephonic unit 58 upon receiving the mirrored transmission from the originating telephonic unit 52 may also do a bit-for-bit comparison of what was received with what the destination telephonic unit 58 originally mirrored back to the originating telephonic unit 52. If the comparison is successful the destination telephonic unit 58 may mirror back what it received with a bit of the source field set to indicated a successful certification routine.

Certification of the transmission may then be provided as a hard-copy from the printer 60. Certification may be a printout of the mirrored image from the source unit 52 with indicia of deliver or a printout of the second mirrored image from the destination unit 58, with indicia of delivery, or both.

In another embodiment of the invention (FIG. 8), apparatus is provided to allow certification of voice transmissions. Under the embodiment, an operator (not shown) of originating telephonic unit (audio interface) 52 enters a telephone number of a destination unit (audio interface) 58 and request for certification through a keyboard 200. As the operator begins speaking, a microphone 208 detects the speech and directs the audio signal to a voice response unit (VRU) 204. Within the VRU 204, the audio signal is detected and using well-known techniques transforms the audio signal into a digital signal (e.g., using pulse coded modulation (PCM). The digital signal is, in turn, transferred to the processor 202.

Figure 8:
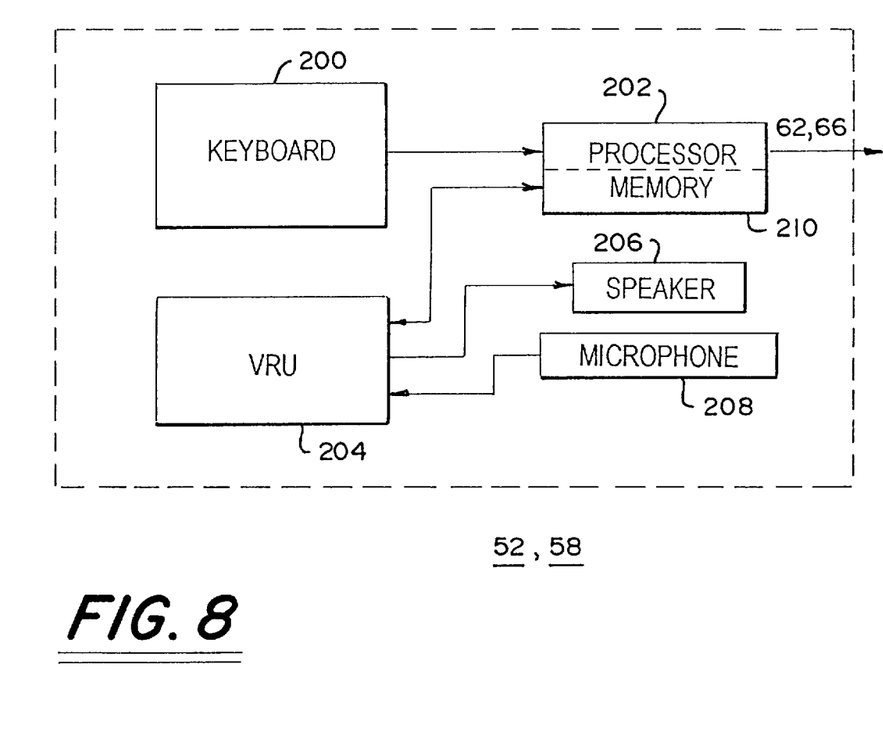
FIG. 8 depicts a voice interface for the apparatus of FIG. 3.

Within the processor 202 the detected speech from the VRU 204 may be broken up (e.g., by word) or an audio message made up of many words and paragraphs may be included as part of a single transmission. In either case, at an appropriate instant, the processor composes a message 70 and forwards the message to the local switch 54 for processing as described above.

Where a response to a message is not expected, the operator may simply enter a destination telephone number and activate a voice message key on the keyboard 200. When the operator finishes speaking, he may press a transmit key to initiate transmission of the message as a single transmission 70. Where the message is too long for a single transmission, the processor 202 may detect such length by overflow of a transmit buffer within a memory 210 and break the transmission 70 into one or more transmissions 70.

At a destination audio interface 58, the transmission is received and mirror image(s) returned for certification as described above. Upon receipt, the transmission stored in a receive buffer may be transferred to the VRU 204 and processed into an audio signal within the VRU 204 and later converted into sound in a speaker 206 for the benefit of a listener (not shown).

Alternatively, the operator may indicate by entry of an appropriate code into the keyboard 200 that a two-way audio exchange is to be certified between the originating and destination telephonic units 52, 58. Where a two-way exchange is certified, each transmission from source unit 52 to destination unit 58 and visa versa is considered as a separate transmission, subject to independent certification. Further, the processor 202 of both source and destination units 52, 58 may buffer outgoing information as required for optimizing the length of each transmission 70. For instance, a buffer within memory 210 may accumulate audio information until full and then be forwarded as part of a single transmission.

To facilitate the exchange of transmissions and mirrored images of transmissions, the audio interfaces 52, 48 may receive telephone service through telephone interconnects 62, 66 under an ISDN format. Where service is provided under a BRI format, the source audio interface 52 may only access a "B" channel only for so long as necessary to forward a transmission. Upon completion of a transmission (and between subsequent transmissions as the buffer fills), the source unit 52 is free to receive mirrored images and to do bit-by-bit comparisons of mirrored images with the content of previous transmissions.

Likewise, the destination audio interface 58 may receive transmissions and store the transmission in a receive buffer in memory 210. The body 72 of the transmission 70 is transferred to the VRU of the destination unit 58 and converted into sound. Where the listener at the destination chooses to respond, he or she may simply begin speaking. Upon detection of sound through the microphone 208, the VRU 204 converts the sound into voice data and transfers such data to a transmit buffer in memory 210 of the processor 202. When the buffer fills, the processor 202 of the destination 58 initiates an independent transmission to the source unit 52. As the source unit 52 receives the transmission, the source unit 52 mirrors the transmission as though the destination were now the source.

Under the embodiment, the printer providing the hard-copy of the certified message may also include a VRU for purposes of printing the content of the certified transmission. Alternatively, the PCM voice data from source and destination units 52, 58 may be stored directly in memory 86 of the local switch 54 and certification provided under some other format.

Under another embodiment of the invention, the transmission 70 is defined to include graphics as well as text. Such graphics may be transmitted as either part of a single transmission or as part of a number of transmissions.

Under another embodiment of the invention, the originating telephonic unit 52 includes a length of each transmission as a separate data field within a body 72 of the transmission 70. The length may be encoded in terms of kilobits of information and may be compared against the length of a received transmission as a further test as to the completeness of a transmission 70.

A specific embodiment of a process for telephonic message certification according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of certifying delivery of a transmission through a public switch telephone network comprising the steps of:

detecting a request for certification by a local telephone switch of the public switch telephone network of a transmission from a first telephonic communication unit;

forwarding the transmission from the first telephonic unit to a second telephonic unit through the local telephone switch;

copying the transmission within the local switch;

detecting a mirrored transmission from the destination telephonic unit to the first telephonic unit;

copying the mirrored transmission within the local switch; and providing a hardcopy of the transmission and identifiers of the first and second telephonic units through a printer of the local switch.

2. The method of certifying delivery of a transmission through a public switch telephone network as in claim 1 further comprising detecting an identifier of the second telephonic unit by the local switch of the first telephonic unit as part of the mirrored transmission.

3. The method of certifying delivery of a transmission through a public switch telephone network as in claim 1 further comprising identifying the first telephonic unit based upon the identity of the local telephone line upon which the call request was received.

4. The method of certifying delivery of a transmission through a public switch telephone network as in claim 1 further comprising receiving a called number from the first telephonic unit.

5. The method of certifying delivery of a transmission through a public switch telephone network as in claim 4 further comprising completing a call connection from the first telephonic unit to the second telephonic unit using the received called number.

6. The method of certifying delivery of a transmission through a public switch telephone network as in claim 1 wherein the step of detecting a mirrored transmission from the second telephonic unit to the first telephonic unit further comprises detecting an incoming call directed to the first telephonic unit.

7. The method of certifying delivery of a transmission through a public switch telephone network as in claim 6 wherein the step of detecting a mirrored transmission from the second telephonic unit to the first telephonic unit further comprises detecting an identifier of the second telephonic unit as an originator of the incoming call directed to the first telephonic unit.

8. The method of certifying delivery of a transmission through a public switch telephone network as in claim 7 wherein the step of detecting an identifier of the second telephonic unit and an originator of the incoming call directed to the first telephonic unit further comprises receiving an ANI number through the call connection of the incoming call.

9. The method of certifying delivery of a transmission through a public switch telephone network as in claim 1 wherein the step of detecting a mirrored transmission from the second telephonic unit to the first telephonic unit further comprises transmitting the mirrored transmission from the second telephonic unit over a telephone connection between the second telephonic unit and the first telephonic unit.

10. The method of certifying delivery of a transmission through a public switch telephone network as in claim 9 wherein the step of transmitting the mirrored transmission from the second telephonic unit over a telephone connection between the second telephonic unit and the first telephonic unit further comprises receiving the transmission from the first telephonic unit and transmitting a mirror image of the transmission back to the first telephonic unit.

11. The method of certifying delivery of a transmission through a public switch telephone network as in claim 10 wherein the step of receiving the transmission from the first telephonic unit and transmitting a mirror image of the transmission back to the first telephonic unit further comprises storing the transmission of the first telephonic unit in a memory of the second telephonic unit.

12. The method of certifying delivery of a transmission through a public switch telephone network as in claim 11 wherein the step of transmitting the mirrored transmission from the second telephonic unit over a telephone connection between the second telephonic unit and the first telephonic unit further comprises retrieving the stored transmission from memory and transmitting the stored transmission as the mirrored transmission.

13. The method of certifying delivery of a transmission through a public switch telephone network as in claim 11 wherein the step of transmitting the mirrored transmission from the second telephonic unit over a telephone connection between the second telephonic unit and the first telephonic unit further comprises receiving an identifier of the calling first telephonic unit along with a call alert of the transmission from the public switch telephone network.

14. The method of certifying delivery of a transmission through a public switch telephone network as in claim 13 wherein the step of transmitting the mirrored transmission from the second telephonic unit over a telephone connection between the second telephonic unit and the first telephonic unit further comprises using the received identifier of the first telephonic unit to create a call path for transmission of the mirrored transmission.

15. The method of certifying delivery of a transmission through a public switch telephone network as in claim 13 wherein the step using the received identifier of the first telephonic unit to create a call path for transmission of the mirrored transmission further comprises transferring the received identifier to a local telephone switch of the second telephonic unit as a dialed number for establishing the call path for the mirrored transmission.

16. Apparatus for certifying delivery of a transmission through a public switch telephone network comprising:

means for detecting a request for certification of a transmission from a first telephonic communication unit by a local telephone switch of the public switch telephone network;

means for forwarding the transmission from the first telephonic unit to a second telephonic unit through the local telephone switch;

means for copying the transmission within the local switch;

means for detecting a mirrored transmission from the destination telephonic unit to the first telephonic unit;

means for copying the mirrored transmission within the local switch; and a printer for providing a hardcopy of the transmissions and identifiers of the first and second telephonic units through the local switch.

17. The apparatus for certifying delivery of a transmission through a public switch telephone network as in claim 16 further comprising means for detecting an identifier of the second telephonic unit by the local switch of the first telephonic unit as part of the mirrored transmission.

18. The apparatus for certifying delivery of a transmission through a public switch telephone network as in claim 16 further comprising means for identifying the first telephonic unit based upon the identity of the local telephone line upon which the call request was received.

19. The apparatus for certifying delivery of a transmission through a public switch telephone network as in claim 16 further comprising means for receiving a called number from the first telephonic unit.

20. The apparatus for certifying delivery of a transmission through a public switch telephone network as in claim 19 further comprising means for completing a call connection from the first telephonic unit to the second telephonic unit using the received called number.

21. The apparatus for certifying delivery of a transmission through a public switch telephone network as in claim 16 wherein the means for detecting a mirrored transmission from the second telephonic unit to the first telephonic unit further comprises means for detecting an incoming call directed to the first telephonic unit.

22. The apparatus for certifying delivery of a transmission through a public switch telephone network as in claim 21 wherein the means for detecting a mirrored transmission from the second telephonic unit to the first telephonic unit further comprises means for detecting an identifier of the second telephonic unit as an originator of the incoming call directed to the first telephonic unit.

23. The apparatus for certifying delivery of a transmission through a public switch telephone network as in claim 22 wherein the means for detecting an identifier of the second telephonic unit and an originator of the incoming call directed to the first telephonic unit further comprises means for receiving an ANI number through the call connection of the incoming call.

24. The apparatus for certifying delivery of a transmission through a public switch telephone network as in claim 16 wherein the means for detecting a mirrored transmission from the second telephonic unit to the first telephonic unit further comprises means for transmitting the mirrored transmission from the second telephonic unit over a telephone connection between the second telephonic unit and the first telephonic unit.

25. The apparatus for certifying delivery of a transmission through a public switch telephone network as in claim 24 wherein the means for transmitting the mirrored transmission from the second telephonic unit over a telephone connection between the second telephonic unit and the first telephonic unit further comprises means for receiving the transmission from the first telephonic unit and transmitting a mirror image of the transmission back to the first telephonic unit.

26. The apparatus for certifying delivery of a transmission through a public switch telephone network as in claim 25 wherein the means for receiving the transmission from the first telephonic unit and transmitting a mirror image of the transmission back to the first telephonic unit further comprises means for storing the transmission of the first telephonic unit in a memory of the second telephonic unit.

27. The apparatus for certifying delivery of a transmission through a public switch telephone network as in claim 26 wherein the means for transmitting the mirrored transmission from the second telephonic unit over a telephone connection between the second telephonic unit and the first telephonic unit further comprises means for retrieving the stored transmission from memory and transmitting the stored transmission as the mirrored transmission.

28. The method of certifying delivery of a transmission through a public switch telephone network as in claim 26 wherein the means for transmitting the mirrored transmission from the second telephonic unit over a telephone connection between the second telephonic unit and the first telephonic unit further comprises means for receiving an identifier of the calling first telephonic unit along with a call alert of the transmission from the public switch telephone network.

29. The apparatus for certifying delivery of a transmission through a public switch telephone network as in claim 28 wherein the means for transmitting the mirrored transmission from the second telephonic unit over a telephone connection between the second telephonic unit and the first telephonic unit further comprises means for using the received identifier of the first telephonic unit to create a call path for transmission of the mirrored transmission.

30. The apparatus for certifying delivery of a transmission through a public switch telephone network as in claim 28 wherein the means for using the received identifier of the first telephonic unit to create a call path for transmission of the mirrored transmission further comprises means for transferring the received identifier to a local telephone switch of the second telephonic unit as a dialed number for establishing the call path for the mirrored transmission.

31. Apparatus for certifying delivery of a transmission through a public switch telephone network comprising:
   a first call controller which detects a request for certification of a transmission from a first telephonic communication unit within a local telephone switch of the public switch telephone network;
   a first call connection which forwards the transmission from the first telephonic unit to a second telephonic unit through the local telephone switch;
   a certification processor which copies the transmission into a memory medium within the local switch;
   a second call controller which detects a mirrored transmission from the destination telephonic unit to the first telephonic unit;
   a second certification processor which copies the mirrored transmission into the memory medium within the local switch; and
   a printer for providing a hardcopy of the transmissions and identifiers of the first and second telephonic units through the local switch.

32. The apparatus for certifying delivery of a transmission through a public switch telephone network as in claim 31 further comprising means for detecting an identifier of the second telephonic unit by the local switch of the first telephonic unit as part of the mirrored transmission.

33. The apparatus for certifying delivery of a transmission through a public switch telephone network as in claim 31 further comprising a connection analyzer which identifies the first telephonic unit based upon the identity of the local telephone line upon which the call request was received.

34. The apparatus for certifying delivery of a transmission through a public switch telephone network as in claim 31 further comprising a second call controller receives a called number from the first telephonic unit.

35. The apparatus for certifying delivery of a transmission through a public switch telephone network as in claim 34 further comprising a matrix switch which completes a call connection from the first telephonic unit to the second telephonic unit using the received called number.

36. The apparatus for certifying delivery of a transmission through a public switch telephone network as in claim 31 wherein the second call controller which detects a mirrored transmission from the second telephonic unit to the first telephonic unit further comprises a third call controller which detects an incoming call directed to the first telephonic unit.

37. The apparatus for certifying delivery of a transmission through a public switch telephone network as in claim 36 wherein the second call controller which detects the mirrored transmission from the second telephonic unit to the first telephonic unit further comprises a fourth call controller which detects an identifier of the second telephonic unit as an originator of the incoming call directed to the first telephonic unit.

38. The apparatus for certifying delivery of a transmission through a public switch telephone network as in claim 37 wherein the fourth call controller which detects an identifier of the second telephonic unit and an originator of the incoming call directed to the first telephonic unit further comprises a memory which receives an ANI number through the call connection of the incoming call.

39. The apparatus for certifying delivery of a transmission through a public switch telephone network as in claim 31 wherein the second call processor which detects a mirrored transmission from the second telephonic unit to the first telephonic unit further comprises a second communication processor which transmits the mirrored transmission from the second telephonic unit over a telephone connection between the second telephonic unit and the first telephonic unit.

40. The apparatus for certifying delivery of a transmission through a public switch telephone network as in claim 39 wherein the second communication processor which transmits the mirrored transmission from the second telephonic unit over a telephone connection between the second telephonic unit and the first telephonic unit further comprises a local processor which receives the transmission from the first telephonic unit and transmits a mirror image of the transmission back to the first telephonic unit.

41. The apparatus for certifying delivery of a transmission through a public switch telephone network as in claim 40 wherein the local processor which receives the transmission from the first telephonic unit and transmits a mirror image of the transmission back to the first telephonic unit further comprises a local memory which stores the transmission of the first telephonic unit.

42. The apparatus for certifying delivery of a transmission through a public switch telephone network as in claim 41 wherein the local processor which transmits the mirrored transmission from the second telephonic unit over a telephone connection between the second telephonic unit and the first telephonic unit further comprises a second local processor which retrieves the stored transmission from memory and transmits the stored transmission as the mirrored transmission.

43. The method of certifying delivery of a transmission through a public switch telephone network as in claim 41 wherein the local processor which transmits the mirrored transmission from the second telephonic unit over a telephone connection between the second telephonic unit and the first telephonic unit further comprises a third local processor which receives an identifier of the calling first telephonic unit along with a call alert of the transmission from the public switch telephone network.

44. The apparatus for certifying delivery of a transmission through a public switch telephone network as in claim 43 wherein the local processor which transmits the mirrored transmission from the second telephonic unit over a telephone connection between the second telephonic unit and the first telephonic unit further comprises a fourth local processor which uses the received identifier of the first telephonic unit to create a call path for transmission of the mirrored transmission.

45. The apparatus for certifying delivery of a transmission through a public switch telephone network as in claim 43 wherein the fourth local processor which uses the received identifier of the first telephonic unit to create a call path for transmission of the mirrored transmission further comprises a modem which transfers the received identifier to a local telephone switch of the second telephonic unit as a dialed number for establishing the call path for the mirrored transmission.

46. A method of certifying delivery of a transmission through a communication network comprising the steps of:
   detecting a request for certification by a local switch of the communication network of a transmission from a first communication unit;
   forwarding the transmission from the first unit to a second communication unit through the local switch;
   copying the transmission including any associated transmission within the local switch;
   detecting a mirrored transmission from the destination unit to the first unit;
   copying the mirrored transmission within the local switch; and
   providing a copy of the transmission and identifiers of the first and second units through the local switch.

47. The method of certifying delivery of a transmission through a communication network as in claim 46 further comprising detecting an identifier of the second communication unit by the local switch of the first unit as part of the mirrored transmission.

48. The method of certifying delivery of a transmission through a communication network as in claim 46 further comprising identifying the first unit based upon the identity of the local communication connection upon which the call request was received.

49. The method of certifying delivery of a transmission through a communication network as in claim 46 further comprising receiving a called number from the first unit.

50. The method of certifying delivery of a transmission through a communication network as in claim 49 further comprising completing a call connection from the first unit to the second unit using the received called number.

51. The method of certifying delivery of a transmission through a communication network as in claim 46 wherein the step of detecting a mirrored transmission from the second unit to the first unit further comprises detecting an incoming call directed to the first unit.

52. The method of certifying delivery of a transmission through a communication network as in claim 51 wherein the step of detecting a mirrored transmission from the second unit to the first unit further comprises detecting an identifier of the second unit as an originator of the incoming call directed to the first unit.

53. The method of certifying delivery of a transmission through a communication network as in claim 52 wherein the step of detecting an identifier of the second unit and an originator of the incoming call directed to the first unit further comprises receiving an ANI number through the call connection of the incoming call.

54. The method of certifying delivery of a transmission through a communication network as in claim 46 wherein the step of detecting a mirrored transmission from the second unit to the first unit further comprises transmitting the mirrored transmission from the second unit over a connection between the second unit and the first unit.

55. The method of certifying delivery of a transmission through a communication network as in claim 52 wherein the step of transmitting the mirrored transmission from the second unit over a connection between the second unit and the first unit further comprises receiving the transmission from the first unit and transmitting a mirror image of the transmission back to the first unit.

56. The method of certifying delivery of a transmission through a communication network as in claim 55 wherein the step of receiving the transmission from the first unit and transmitting a mirror image of the transmission back to the first unit further comprises storing the transmission of the first unit in a memory of the second unit.

57. The method of certifying delivery of a transmission through a communication network as in claim 56 wherein the step of transmitting the mirrored transmission from the second unit over a connection between the second unit and the first unit further comprises retrieving the stored transmission from memory and transmitting the stored transmission as the mirrored transmission.

58. The method of certifying delivery of a transmission through a communication network as in claim 56 wherein the step of transmitting the mirrored transmission from the second unit over a connection between the second unit and the first unit further comprises receiving an identifier of the calling first unit along with a call alert of the transmission from the communication network.

59. The method of certifying delivery of a transmission through a communication network as in claim 58 wherein the step of transmitting the mirrored transmission from the second unit over a connection between the second unit and the first unit further comprises using the received identifier of the first unit to create a call path for transmission of the mirrored transmission.

60. The method of certifying delivery of a transmission through a communication network as in claim 58 wherein the step using the received identifier of the first unit to create a call path for transmission of the mirrored transmission further comprises transferring the received identifier to a local switch of the second unit as a dialed number for establishing the call path for the mirrored transmission.

61. The method of certifying delivery of a transmission through a communications network as in claim 46 wherein the local switch further comprises a facsimile machine.

* * * * *